(12) United States Patent
Nakahashi et al.

(10) Patent No.: US 6,767,105 B2
(45) Date of Patent: Jul. 27, 2004

(54) PLANAR LIGHTING DEVICE

(75) Inventors: Sumio Nakahashi, Niihama (JP); Hirozumi Taguchi, Niihama (JP); Nozomu Bitou, Niihama (JP); Masaya Suzuki, Niihama (JP)

(73) Assignees: Nissen Chemitec Corporation, Niihama (JP); Nippon Chemitec Corporation, Niihama (JP)

( * ) Notice: Subject to any disclaimer, the term of this patent is extended or adjusted under 35 U.S.C. 154(b) by 0 days.

(21) Appl. No.: 10/205,447

(22) Filed: Jul. 26, 2002

(65) Prior Publication Data

US 2003/0021123 A1 Jan. 30, 2003

(30) Foreign Application Priority Data

| Jul. 27, 2001 | (JP) | ...... 2001-227669 |
| Jul. 31, 2001 | (JP) | ...... 2001-232360 |
| Oct. 22, 2001 | (JP) | ...... 2001-324017 |
| Apr. 16, 2002 | (JP) | ...... 2002-113497 |

(51) Int. Cl.[7] ............................................. G01D 11/28
(52) U.S. Cl. .................... 362/27; 362/31; 362/331; 362/337; 362/561; 385/901
(58) Field of Search ..................... 362/331, 336, 362/337, 338, 339, 560, 561, 31, 26, 27, 330; 385/901, 36, 37

(56) References Cited

U.S. PATENT DOCUMENTS

| 5,377,084 A | * | 12/1994 | Kojima et al. ............. 362/31 |
| 5,711,589 A | * | 1/1998 | Oe et al. .................... 362/31 |
| 5,863,113 A | * | 1/1999 | Oe et al. .................... 362/31 |
| 5,995,288 A |   | 11/1999 | Kashima et al. ........... 359/599 |
| 5,999,685 A |   | 12/1999 | Goto et al. ................. 385/146 |
| 6,075,649 A | * | 6/2000 | Naito ......................... 359/619 |

* cited by examiner

*Primary Examiner*—John Anthony Ward
(74) *Attorney, Agent, or Firm*—Oblon, Spivak, McClelland, Maier & Neustadt, P.C.

(57) ABSTRACT

A simple and inexpensive planar lighting device realizing a high luminance is provided, including: a light guide plate having a pair of opposite light entry faces, a light emitting face extending perpendicularly to the light entry faces, a plurality of hemispherical surfaces formed on the light emitting face, and a light non-emitting face opposite to the light emitting face; a light source disposed to extend along each of the light entry faces; a reflector for reflecting light from the light source toward a respective one of the light entry faces; a reflecting plate disposed to extend along the light non-emitting face for reflecting light leaking from the light guide plate toward the light guide plate; and a lens sheet disposed to extend along the light emitting face and formed with a plurality of first ridges extending parallel with the light entry faces on a face thereof opposite to the light emitting face, the first ridges each having a triangular section.

9 Claims, 18 Drawing Sheets

Fig.16

Working Conditions ( Blasting Distance : 200mm )
Initial Pressure : 0.34 (Mpa)

| Distance | Amount of Change in Blasting Pressure | Difference between Amounts of Changes in Blasting Pressure (Mpa) |
|---|---|---|
| 54c — 0 | | |
| 54 → | 0.002Mpa/2mm | |
| b1 — 60 | | 0.001 |
| b2 — | 0.003Mpa/2mm | |
| 90 | | 0.002 |
| b3 — 102 | 0.005Mpa/2mm | 0.0025 |
| b4 — 114 | 0.0075Mpa/2mm | 0.0025 |
| b5 — | 0.010Mpa/2mm | |
| 130 | | 0.005 |
| b6 — | 0.015Mpa/2mm | |
| 150 | | 0.005 |
| b7 — | 0.020Mpa/2mm | |
| 170 | | 0.005 |
| b8 — 190 | 0.025Mpa/2mm | 0.005 |
| b9 — 210 | 0.030Mpa/2mm | |

PLANAR LIGHTING DEVICE

BACKGROUND OF THE INVENTION

1. Field of the Invention

The present invention relates to a planar lighting device for use as a backlight of a liquid crystal display panel.

2. Description of the Related Art

FIG. 18 shows a conventional planar lighting device 1 of this type for lighting a liquid crystal display panel (A) from behind. The planar lighting device 1 includes a light guide plate 2 having a pair of opposite light entry faces 2a, a light non-emitting face 2b and a light emitting face 2c, the light non-emitting face 2b being printed with plural dot patterns 2d. A light source 3 and a reflector 4 are disposed to extend along each of the light entry faces 2a. A reflecting plate 5 is disposed to extend along the light non-emitting face 2b. A diffuser 6, a first lens 7, a second lens 8 and a diffuser sheet 9 are disposed in this order to extend along the light emitting face 2c.

When the light sources 3 of the planar lighting device 1 disposed at the back of the liquid crystal display panel (A) are turned ON, light from each light source 3 becomes incident on respective light entry face 2a either directly or via the reflector 4 and enters the light guide plate 2. Then, light is irregularly reflected by the dot patterns 2d and emitted from the light emitting face 2c. After light thus emitted is diffused by the diffuser 6, the direction of light is corrected through lenses 7 and 8, and then light is further diffused by the diffuser sheet 9. Finally, light is applied onto the liquid crystal display panel (A).

Such a prior art lighting device is adapted to reflect light irregularly by means of plural dot patterns 2d and hence involves a problem of a high loss of light due to scattering of light. For this reason, such a loss of light must be compensated for by enhancing the output power of light sources 3 or increasing the number of light sources 3 used, thus resulting in the device upsized as a whole with an increased cost.

Accordingly, it is a main object of the present invention to provide a planar lighting device which is capable of realizing a higher luminance without incurring inconveniences such as upsizing of the device.

SUMMARY OF THE INVENTION

According to the present invention, there is provided a planar lighting device comprising:

a light guide plate having a pair of opposite light entry faces, a light emitting face extending perpendicularly to the light entry faces, a plurality of hemispherical surfaces formed on the light emitting face, and a light non-emitting face opposite to the light emitting face;

a light source disposed to extend along each of the light entry faces;

a reflector for reflecting light from the light source toward a respective one of the light entry faces;

a reflecting plate disposed to extend along the light non-emitting face for reflecting light leaking from the light guide plate toward the light guide plate; and a lens sheet disposed to extend along the light emitting face and formed with a plurality of first ridges extending parallel with the light entry faces on a face thereof opposite to the light emitting face, the first ridges each having a triangular section.

When the light sources 14 of the planar lighting device thus constructed according to the present invention are turned ON, light from the light sources enters the light guide plate from the light entry faces either directly or via respective reflectors. Light in the light guide plate passes through a wall surface of the light guide plate and is emitted to the outside when the angle of incidence on the wall surface meets a predetermined condition. The reflecting plate reflects light leaking from the light non-emitting face to return it into the light guide plate. Light emitted from the light emitting face becomes incident on the lens sheet. The direction of light incident on the lens sheet is corrected to a direction perpendicular to the light emitting face by means of the first ridges, and then light is applied to a liquid crystal display panel coupled with the lighting device.

Light reflected by the hemispherical surfaces of the light emitting face and light passing through the hemispherical surfaces are regularly directed so as to advance in a predetermined direction and, therefore, there is no possibility of scattering of light which would otherwise be caused by dot patterns provided in the prior art. Further, since light emitted from the hemispherical surfaces exhibits directionality with an inclination relative to the light emitting face at a predetermined angle, the direction of substantially the whole of light incident on the lens sheet is corrected to the direction perpendicular to the light emitting face by means of the first ridges.

Since the direction of light is corrected by both the hemispherical surfaces of the light emitting face and the first ridges of the lens sheet, the efficiency of light supply to the liquid crystal display panel can be improved by leaps and bounds.

Preferably, the planar lighting device further comprises a plurality of second ridges formed on the light non-emitting face of the light guide plate to extend in a direction perpendicular to the first ridges, the second ridges each having a triangular section, and a diffuser sheet disposed to extend along a light emitting face of the lens sheet.

With this feature, the direction of light is further corrected by the second ridges and, hence, the efficiency of light supply to the liquid crystal display panel can be further enhanced.

In a preferred embodiment of the present invention, the planar lighting device further comprises a reflection-type polarizing film which allows one polarized component of light from the lens sheet to pass therethrough but reflects other polarized component of the light, the reflection-type polarizing film being disposed to extend along a light emitting face of the lens sheet.

With this feature, only one of p-polarized light and s-polarized light is superposed on itself and applied onto the liquid crystal display panel and, hence, the luminance of the liquid crystal display panel can be further enhanced.

In another preferred embodiment of the present invention, the light emitting face of the light guide plate is formed with a plurality of projections each having an outward surface forming each of the hemispherical surfaces.

According to this feature, the outward surface of each projection forms each of the hemispherical surfaces.

In an alternative preferred embodiment of the present invention, the light emitting face of the light guide plate is formed with a plurality of depressions each having an internal surface forming each of the hemispherical surfaces.

According to this feature, the internal surface of each depression forms each of the hemispherical surfaces.

The foregoing and other objects, features and attendant advantages of the present invention will become apparent from the following detailed description of the present invention when read in conjunction with the accompanying drawings.

BRIEF DESCRIPTION OF THE DRAWINGS

FIG. 16 is a view illustrating a blasting pressure control method employed in an experiment;

DETAILED DESCRIPTION OF THE PREFERRED EMBODIMENTS

The present invention will now be described in detail with reference to the accompanying drawings.

Figure 1:
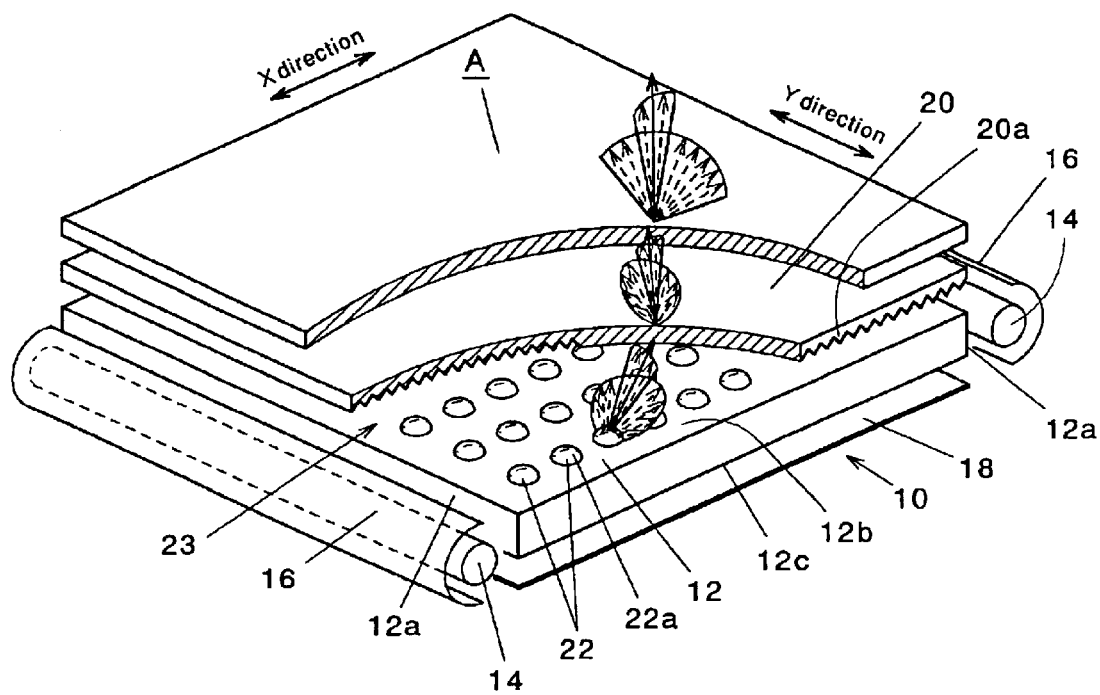
FIG. 1 is a perspective view showing one embodiment of the present invention.

Referring first to FIG. 1 showing a planar lighting device 10 as one embodiment of the present invention, the lighting device 10 is of the type for use as a backlight for illuminating a liquid crystal display panel (A) such as used in a TV set or a computer display from behind and includes a light guide plate 12, light sources 14, reflectors 16, a reflecting plate 18, a lens sheet 20, and the like.

The light guide plate 12 is formed from a translucent material such as an acrylic resin and has light entry faces 12a formed on opposite laterals sides thereof, a light emitting face 12b formed on an upper side thereof, and a light non-emitting face 12c formed on a lower side thereof. The light emitting face 12b is formed with a plurality of projections 22 each having a smooth hemispherical outward surface forming a hemispherical surface 22a. The diameter and the height of each projection 22 are established so as to become larger and higher as the projection 22 is situated closer to the center of the light emitting face 12b, or to become smaller and lower as the projection 22 is situated closer to an edge of the light emitting face 12b, in order for the amount of light to become even over the entire light emitting face 12b.

It should be noted that an optical pattern formed by the projections 22 is variable depending upon the shape and the size of the light guide plate 12 and hence is not limited to the optical pattern used in this embodiment.

The light sources 14 are each disposed to extend along a respective one of the light entry faces 12a of the light guide plate 12. The reflecting plate 18 is disposed to extend along the light non-emitting face 12c, while the lens sheet 20 disposed to extend along the light emitting face 12b. Further, reflectors 16 are each disposed to cover a respective one of the light sources 14.

Figure 2:
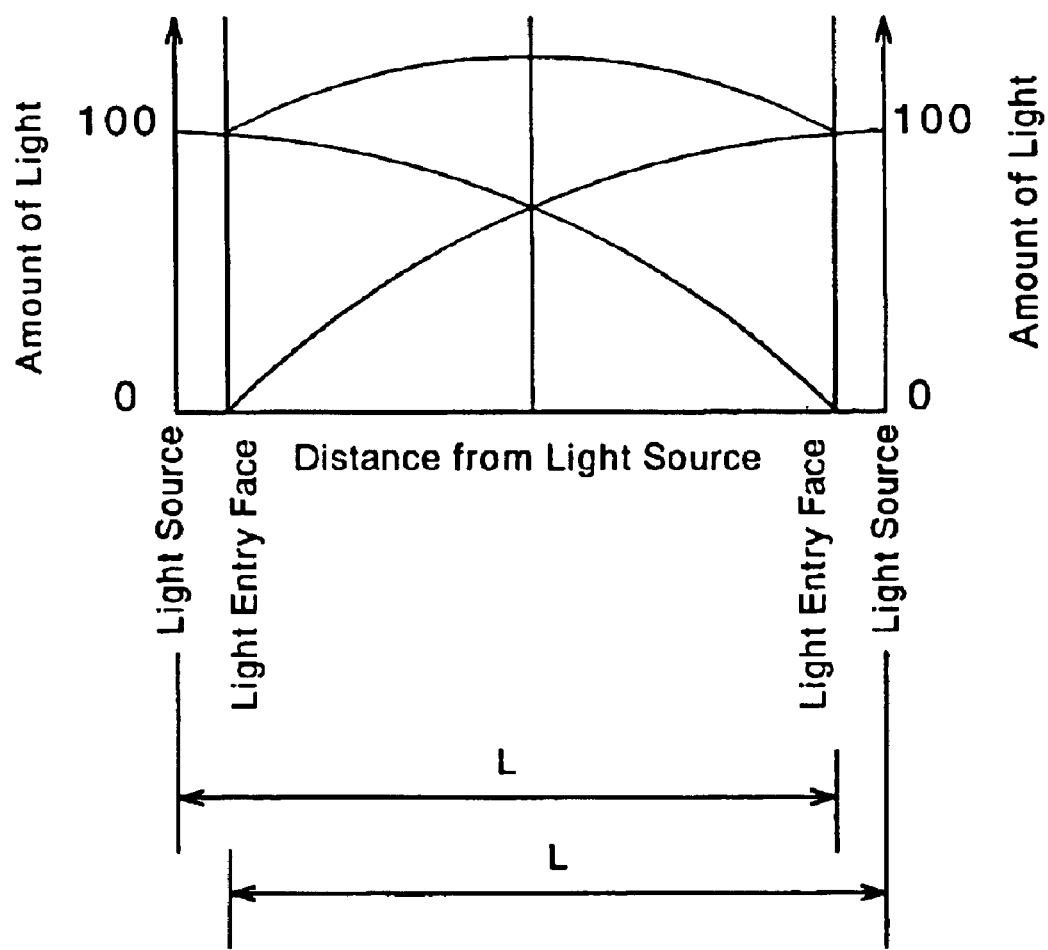
FIG. 2 is a graph representing the relationship between the distance from a light source and the amount of light.

Each of the light sources 14 is adapted to apply light to the entire surface of each light entry face 12a and comprises a cold cathode tube, a fluorescent lamp, a halogen lamp or the like. As shown in FIG. 2, the output power of each light source 14 is established so that the maximum throw of light emitted from each light source 14 becomes substantially equal to distance L from the light source 14 disposed to extend along one light entry face 12a to the other light entry face 12a. This arrangement makes it possible to avoid wasteful consumption of light and hence enhance the efficiency of utilization of light.

Each of the reflectors 16 is adapted to reflect light emitted from a respective one of the light sources 14 toward a corresponding light entry face 12a and is formed to have a semicylindrical shape using a specularly-reflective material such as a metal foil or an irregularly-reflective material such as a white PET film.

The reflecting plate 18 is adapted to reflect light leaking from the light guide plate 12 toward the light guide plate 12 and is formed from a specularly-reflective material or an irregularly-reflective material.

The lens sheet 20 serves to correct the direction of light to a direction substantially perpendicular to the light emitting face 12b of the light guide plate 12 and is formed from a translucent material such as an acrylic resin. The lower side of the lens sheet 20, i.e., the side opposite to the light emitting face 12b of the light guide plate 12, is formed with a plurality of first ridges 20a extending parallel with the light entry faces 12a of the light guide plate 12, the first ridges 20a each having a triangular section. The first ridges 20a serve to change the direction of light.

When the light sources 14 of the planar lighting device 10 disposed at the back of the liquid crystal display panel A are turned ON, light from each light source 14 enters the light guide plate 12 from each light entry face 12a either directly or via respective reflector 16 and advances in the light guide plate 12 while being reflected by a wall surface of the light guide plate 12. Light in the light guide plate 12 is emitted to the outside through the wall surface when the angle of incident of light on the wall surface of the light guide plate 12 meets a predetermined condition. The reflecting plate 18 reflects light leaking from the light non-emitting face 12b to return it into the light guide plate 12. Light emitted from the light emitting face 12b becomes incident on the lens sheet 20. The direction of light incident on the lens sheet 20 is corrected to a direction perpendicular to the light emitting face 12b by means of the first ridges 20a so that light is applied to the liquid crystal display panel (A).

Light reflected by the hemispherical surfaces 22a of the projections 22 formed on the light emitting face 12b and light passing through the hemispherical surfaces 22a are regularly directed to advance in a predetermined direction and, hence, there is no loss of light due to scattering of light at the hemispherical surfaces 22a. Further, since light emitted from the hemispherical surfaces 22a is inclined at a predetermined angle (about 70°) relative to the light emitting face 12b as shown in FIG. 3(A), the direction of substantially the whole of light incident on the lens sheet 20 is corrected to the direction perpendicular to the light emitting face 12b by means of the first ridges 20a.

Figure 3:
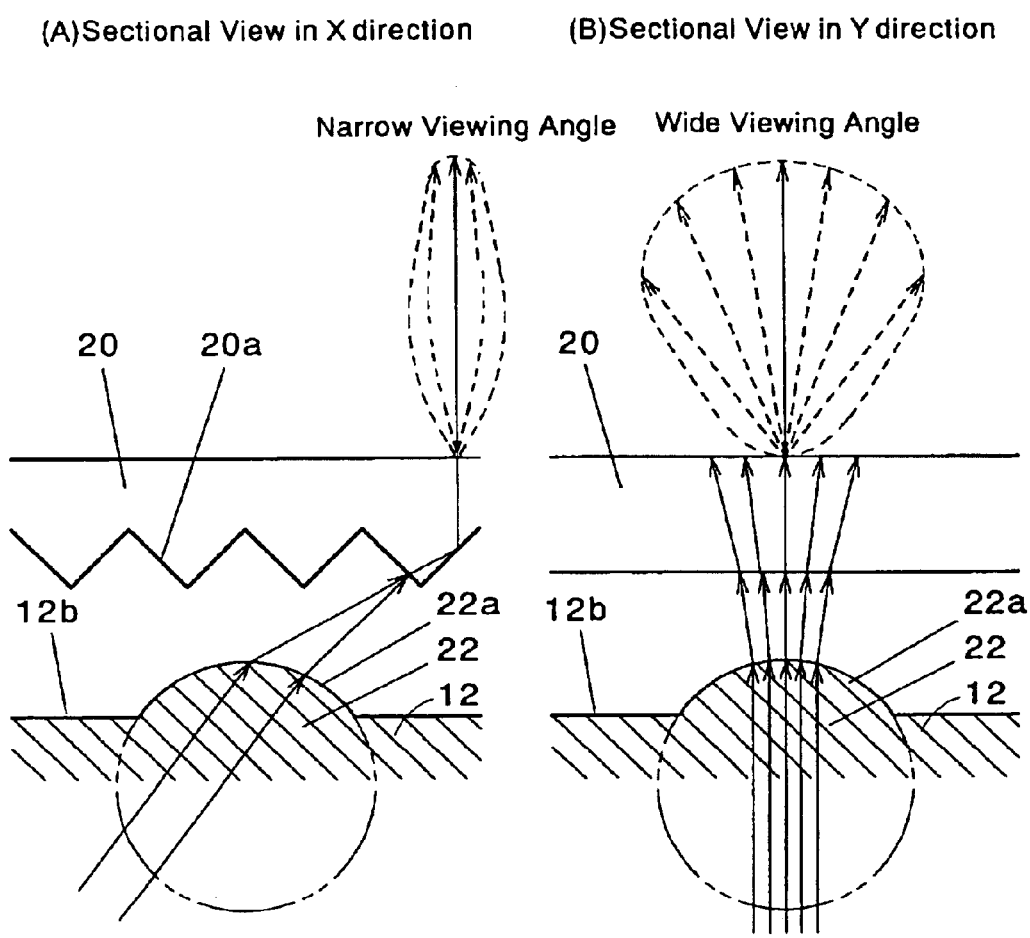
FIG. 3 is a schematic view illustrating a state of light passing through a hemispherical surface and a lens sheet.

As shown in FIG. 3, light incident on the lens sheet 20 is gathered not in a direction parallel with the first ridges 20a (hereinafter referred to as "Y direction") but in a direction perpendicular to the first ridges 20a (hereinafter referred to as "X direction" and, hence, light gathered in the X direction provides a narrow viewing angle in the X direction (see FIG. 3(A)) and a wide viewing angle in the Y direction (see FIG. 3(B)) when it is applied to the liquid crystal display panel (A).

This embodiment is capable of correcting the direction of light by means of the hemispherical surfaces 22a of the light emitting face 12b and the first ridges 20a of the lens sheet 20 both and hence makes it possible to enhance the efficiency of light supply to the liquid crystal display panel (A) by leaps and bounds. Thus, this embodiment provides a lighting device capable of realizing a higher luminance easily without the need to enhance the output power of the light sources 14 or increase the number of light sources 14. Further, with this embodiment it is possible to downsize the planar light device 10 as well as to reduce the cost significantly.

Figure 4:
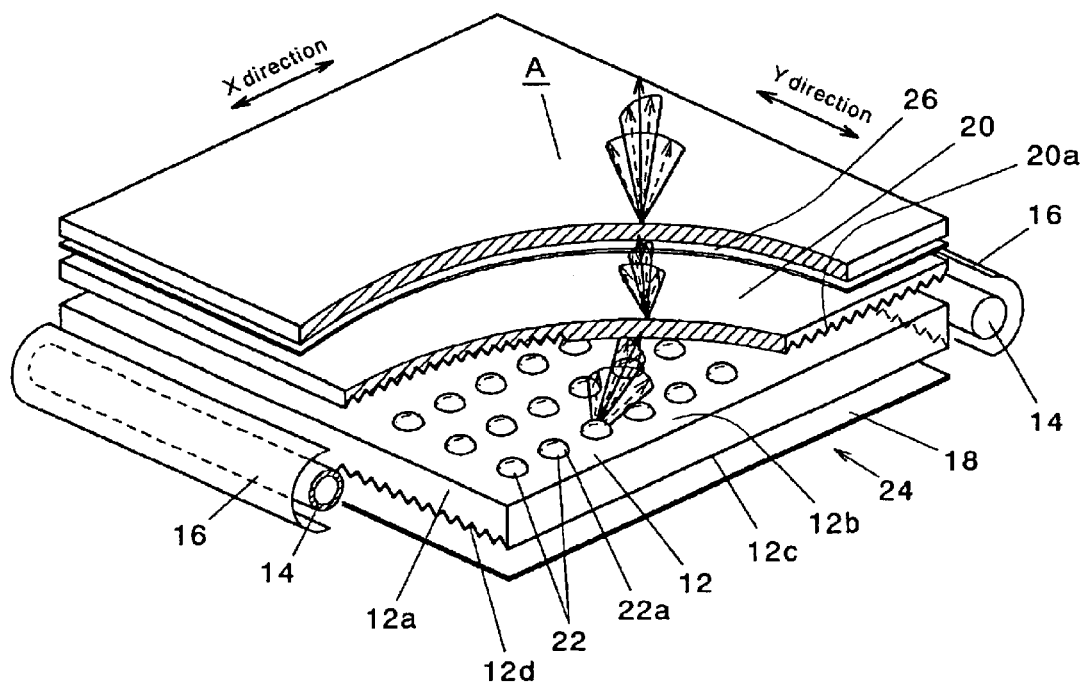
FIG. 4 is a perspective view showing another embodiment of the present invention.

A planar lighting device 24 shown in FIG. 4 as another embodiment of the present invention is a lighting device improved from the planar lighting device 10 shown in FIG. 1. This planar lighting device 24 has a plurality of second ridges 12d formed on light non-emitting face 12c of light guide plate 12, the second ridges 12d each extending in a direction perpendicular to the light entry faces 12a, and a diffuser sheet 26 extending along the upper side, i.e., the light emitting face, of lens sheet 20. Since first ridges 20a of lens sheet 20 are formed to extend parallel with light entry faces 12a, the first ridges 20a and the second ridges 12d extend perpendicular to each other. The second ridges 12d may be shaped so that crests and roots alternate continuously as shown in FIG. 4 or intermittently.

In the planar lighting device 24 light incident on the light guide plate 12 is gathered in the Y direction by means of the second ridges 12d. Light thus gathered is emitted from the light emitting face 12b and applied onto the liquid crystal display panel (A) through the lens sheet 20 and the diffuser sheet 26 when a predetermined condition is met. Since light is gathered in the X direction at the lens sheet 20 as described above, this embodiment provides narrow viewing angles in both the X direction and the Y direction, thereby enhancing the luminance in a direction perpendicular to the light emitting face 12b. When light having passed through the lens sheet 20 becomes incident on the diffuser sheet 26, the directionality of light is loosened, so that the intensity of light is rendered even over the entire surface of the diffuser sheet 26.

Figure 5:
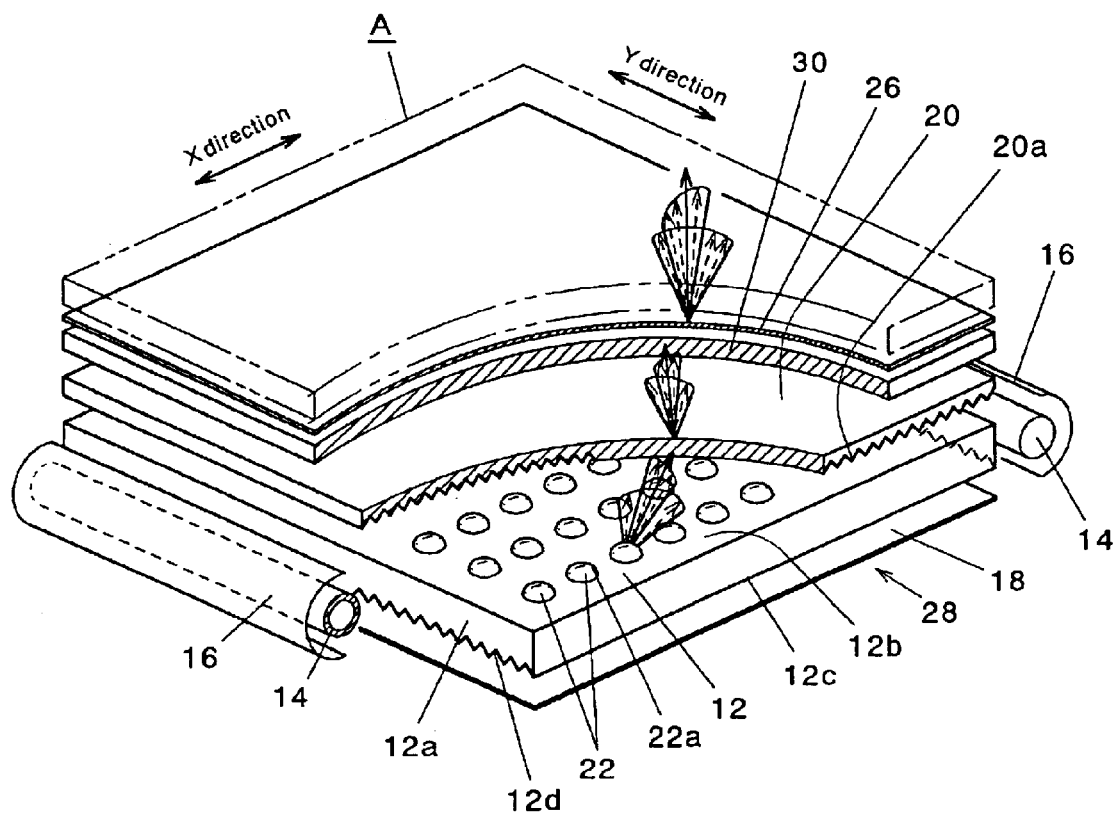
FIG. 5 is a perspective view showing yet another embodiment of the present invention.
Figure 6:
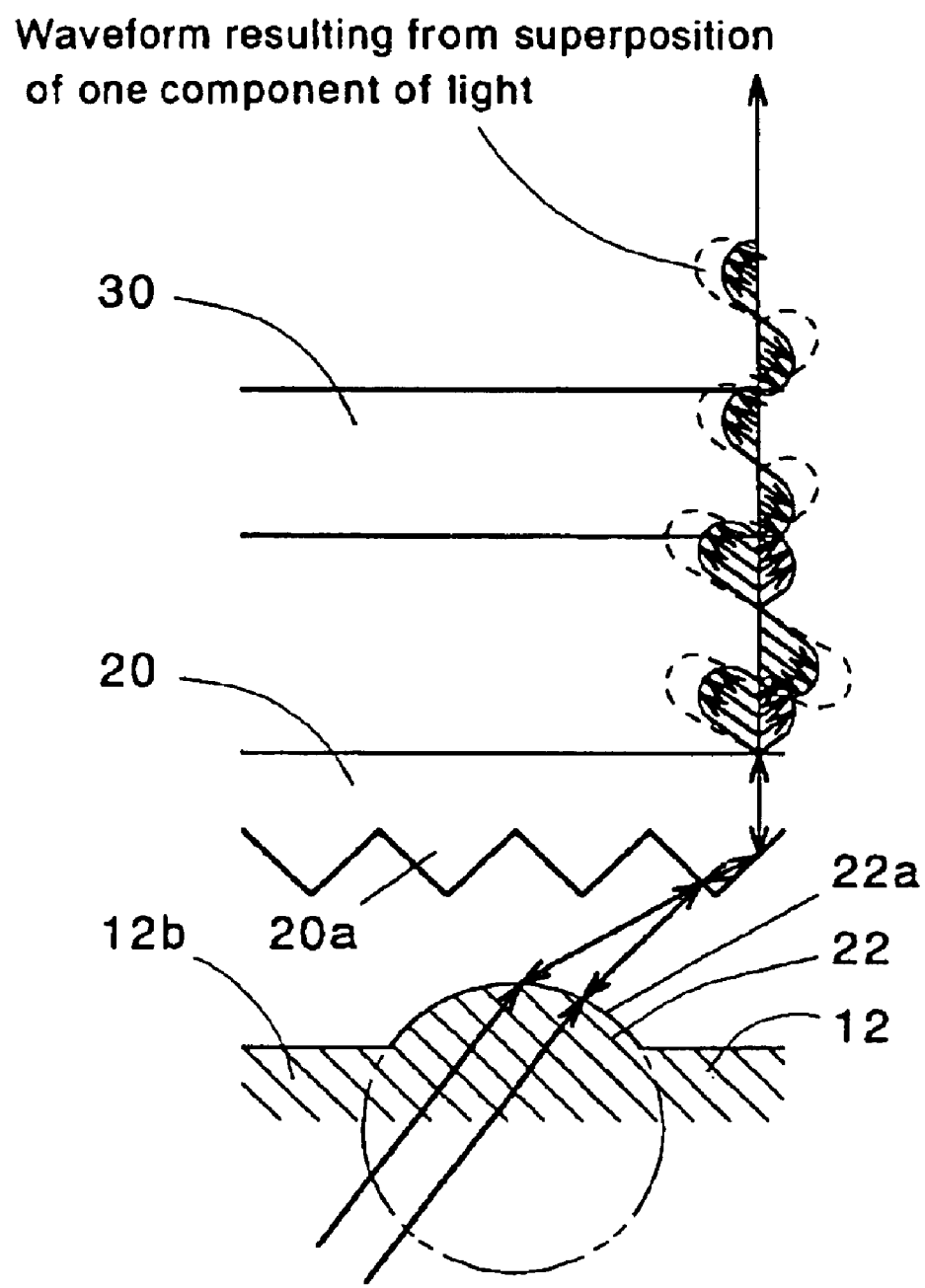
FIG. 6 is a schematic view illustrating a superposed state of one component of light in the embodiment shown in FIG. 5.

A planar lighting device 28 shown in FIG. 5 as yet another embodiment of the present invention is a lighting device improved from the planar lighting device 24 shown in FIG. 4. The lighting device 28 has a reflection-type polarizing film 30 disposed to extend along the light emitting face of lens sheet 20. The reflection-type polarizing film 30 has a function of allowing one polarized component of incident light (p-polarized light or s-polarized light) to pass therethrough but reflecting the other polarized component (s-polarized light or p-polarized light). Thus, only one of p-polarized light and s-polarized light is emitted from the reflection-type polarizing film 30 in a superposed fashion as shown in FIG. 6 and, therefore, the lighting device provides a further enhanced luminance in a direction perpendicular to light emitting face 12b.

Such an arrangement employing reflection-type polarizing film 30 may be applied to FIG. 1 embodiment, or the planar lighting device 10.

Although each of the foregoing embodiments has light emitting face 12b formed with plural projections 22 each having an outward surface forming each hemispherical surface 22a, it is possible to provide light emitting face 12b with plural depressions each having an internal surface forming each hemispherical surface 22a instead of the projections 22. Since this arrangement also is capable of regularly directing light so that light advances in a predetermined direction, the lighting device makes it possible to prevent scattering of light and hence provides an enhanced luminance.

Method of Manufacturing a Light Guide Plate

Figure 7:
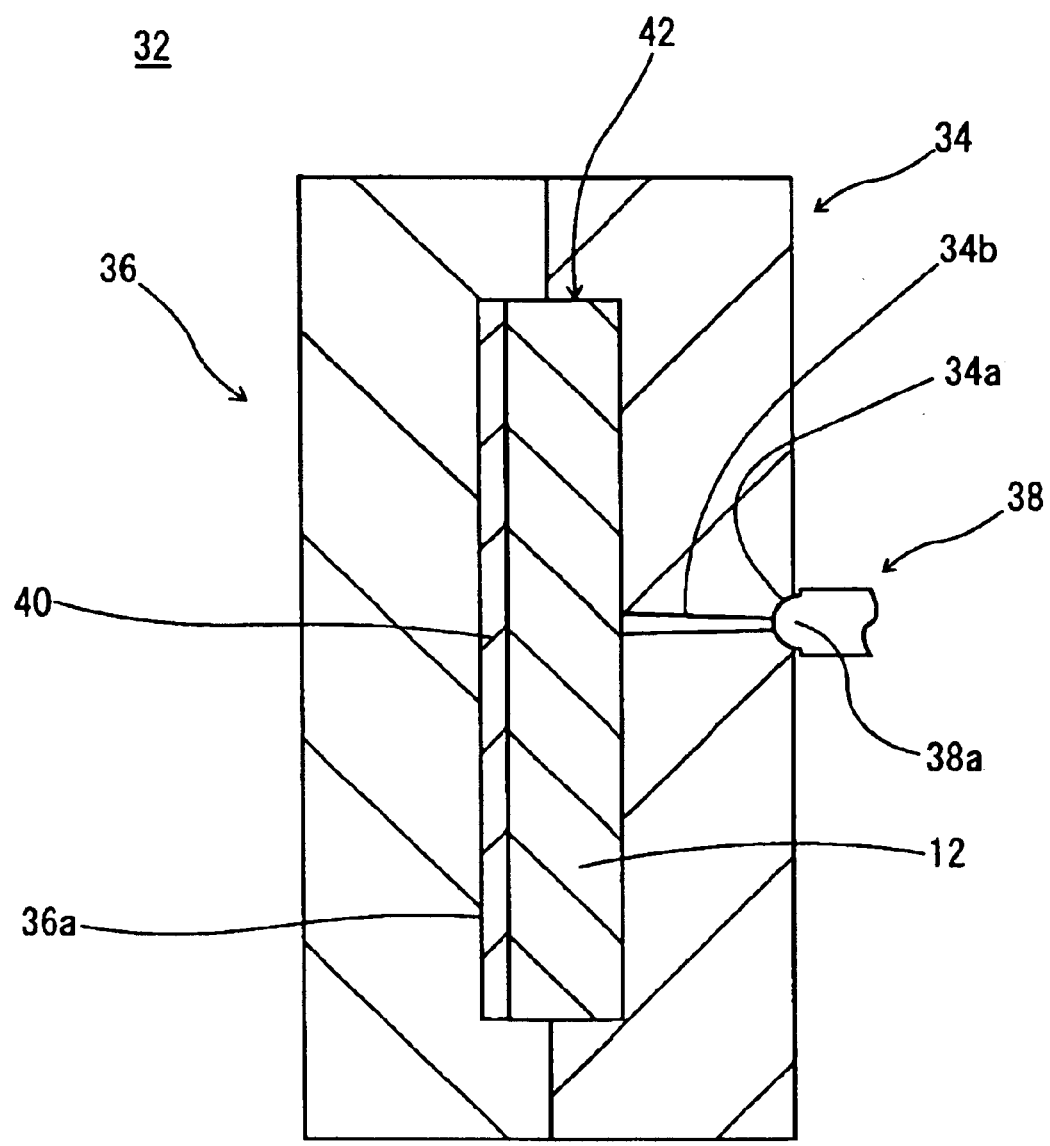
FIG. 7 is a view illustrating a method of manufacturing a light guide plate.

Light guide plate 12 used in each of the foregoing embodiments is characterized in that a plurality of hemispherical surfaces 22a forming optical pattern 23 are formed on light emitting face 12b. Such a light guide plate 12 is manufactured using a manufacturing apparatus 32 as shown in FIG. 7.

The manufacturing apparatus 32 includes a first mold 34, a second mold 36, an injection device 38, and a replica plate 40.

The first mold 34 together with the second mold 37 defines a cavity 42 and has a lateral side formed with a gate 34a, which communicates with the cavity 42 through a runner 34b extending through the first mold 34.

The second mold 36 together with the first mold 34 defines the cavity 42 and has an internal face formed with a fitting surface 36a for fitting the replica plate 40 thereon. The fitting surface 36a is smooth-finished so as to hold the replica plate 40 stably as well as to prevent the replica plate 40 from deforming. Bolt holes (not shown) are defined at the peripheral edge of the fitting surface 36a for threading engagement with bolts to secure the replica plate 40.

The first mold 34 and the second mold 36 are fixed to a mold plate not shown and are opened and closed by means of a hydraulic cylinder not shown.

The injection device 38 is adapted to inject a molten synthetic resin material (acrylic resin or the like) into the cavity 42 and includes an injection nozzle 38a to be connected to the gate 34a.

Figure 8:
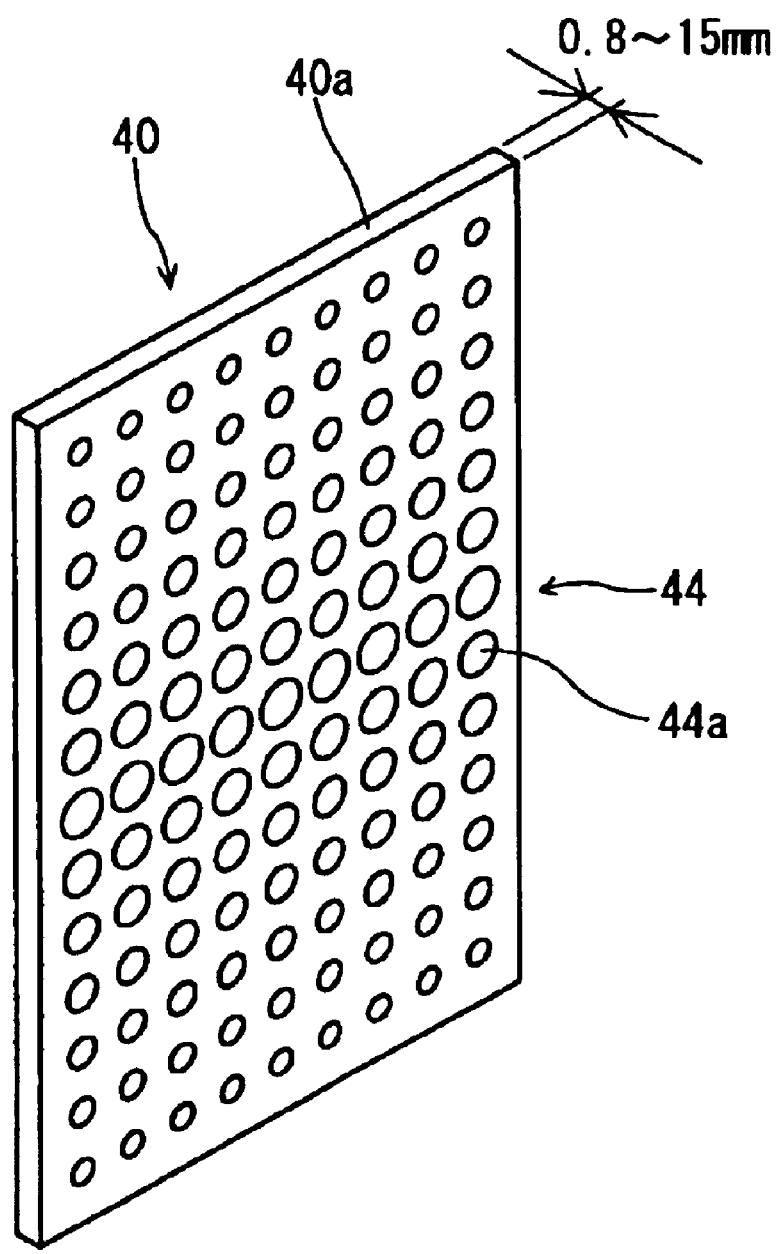
FIG. 8 is a perspective view showing a replica plate.

As shown in FIG. 8, the replica plate 40 comprises a plate-shaped body 40a of nickel or the like having a surface formed with a pattern 44 corresponding to the optical pattern 23 to be formed on the light emitting face 12b of the light guide plate 12. In the case where the optical pattern 23 is formed of a set of projections 22, dots 44a forming the pattern 44 are depressions. Alternatively, in the case where the optical pattern 23 is formed of a set of depressions, dots 44a forming the pattern 44 are projections.

In manufacturing the light guide plate 12 with use of the manufacturing apparatus 32, firstly the replica plate 40 is fitted to the fitting surface 36a of the second mold 36 with the bolts. The replica plate 40 may be fitted to the fitting surface 36a by any other method, such as a method utilizing suction by vacuum or a method employing a stationary frame, than the method using such bolts.

Subsequently, the first mold 34 and the second mold 36 are closed by means of a hydraulic cylinder not shown, and the injection nozzle 38a of the injection device 38 is connected to the gate 34a of the first mold 34. Then, the injection device 38 injects molten resin into the cavity 42. Since the molten resin fills the cavity 42 conformably with the pattern 44 of the replica plate 40, the resulting molten resin mass has a surface formed with the optical pattern 23, which is the reverse of the pattern 44. After lapse of a predetermined time period from the injection of the molten resin, the first mold 34 and the second mold 36 are opened, and the light guide plate 12 thus molded is released from the molds.

With this method by which the optical pattern 23 is formed using the replica plate 40, it is possible to manufacture light guide plates having different optical patterns 23 easily by merely changing the replica plate 40 for a substitute.

The inventors of the present invention examined the qualities of respective light guide plates 12 manufactured by varying the thickness t (mm) of a thinnest portion of a 14-inch replica plate 40 and the arithmetic mean roughness h (Ra) of fitting surface 36a and estimated the suitability of each of the light guide plates 12 for practical use. The results are shown in Table 1.

TABLE 1

| | | Thickness t (mm) of Replica Plate | | | | | |
|---|---|---|---|---|---|---|---|
| | | 0.6 | 0.8 | 1.0 | 1.2 | 1.4 | 1.6 |
| Arithmetic Mean Roughness h (Ra) | 17.5 | X | X | X | Δ | ○ | ○ |
| | 8.75 | X | X | Δ | ○ | ○ | ○ |
| | 6.3 | X | Δ | ○ | ○ | ○ | ○ |
| | 3.2 | X | ○ | ○ | ○ | ○ | ○ |
| | 1.5 | Δ | ○ | ○ | ○ | ○ | ○ |

○: good, Δ: ordinary, X: bad

As seen from Table 1, the thickness t of a thinnest portion of a replica plate 40 having suitability for practical use was 0.8 mm or more. That is, if the thickness t is less than 0.8 mm, the roughness h of the fitting surface 36a has to be 1.5 Ra or less, which requires mirror polishing. This case is not practical from the viewpoints of the cost and time needed for working. If the thickness t is 0.8 mm or more, on the other hand, it is sufficient for the roughness h of the fitting surface 36a to assume 3.2 Ra or more, which does not require mirror polishing. In this case it is possible to reduce the cost for working and shorten the time period needed for working.

Figure 9:
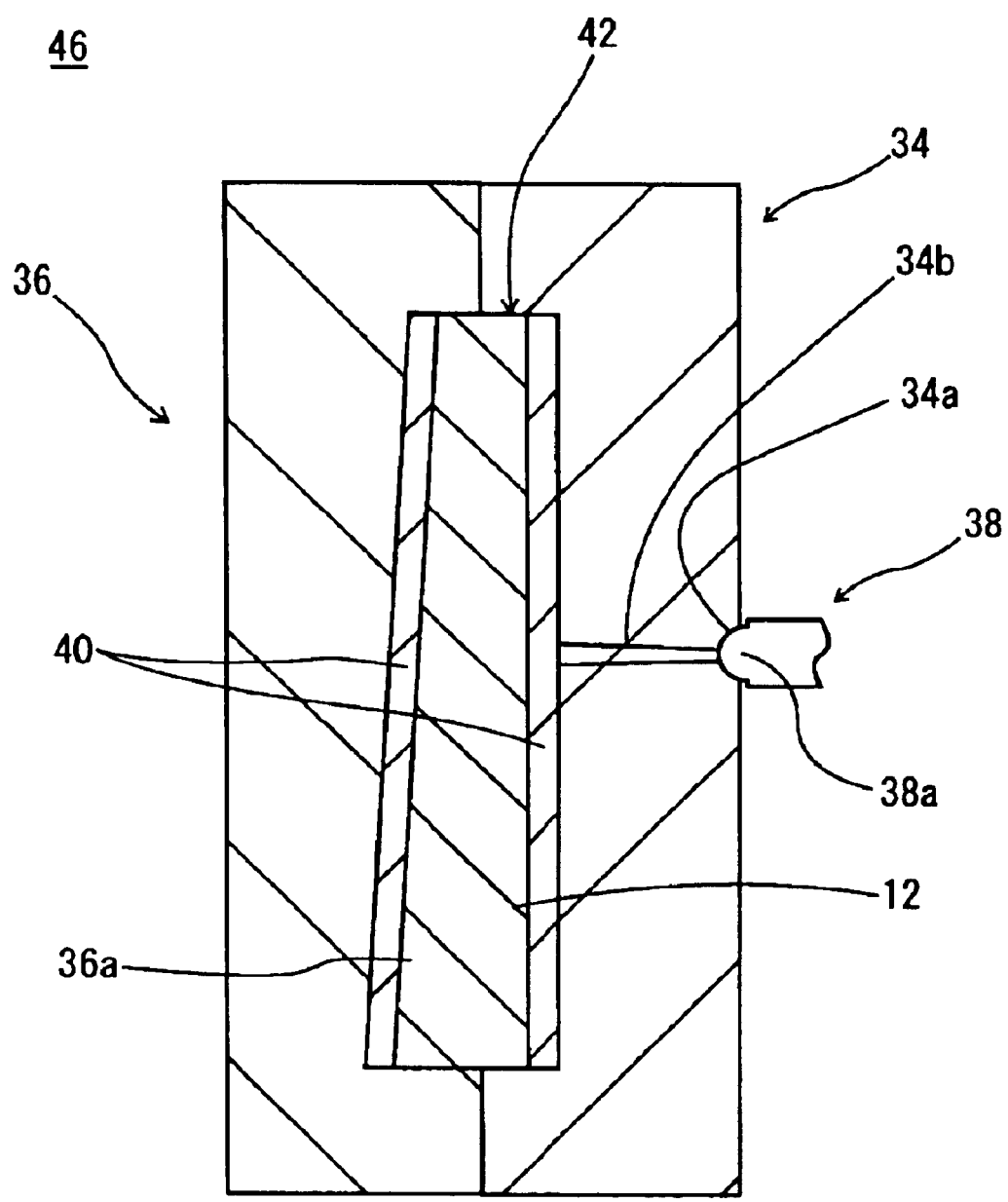
FIG. 9 is a view illustrating a method of manufacturing a liquid guide plate of another type.
Figure 10:
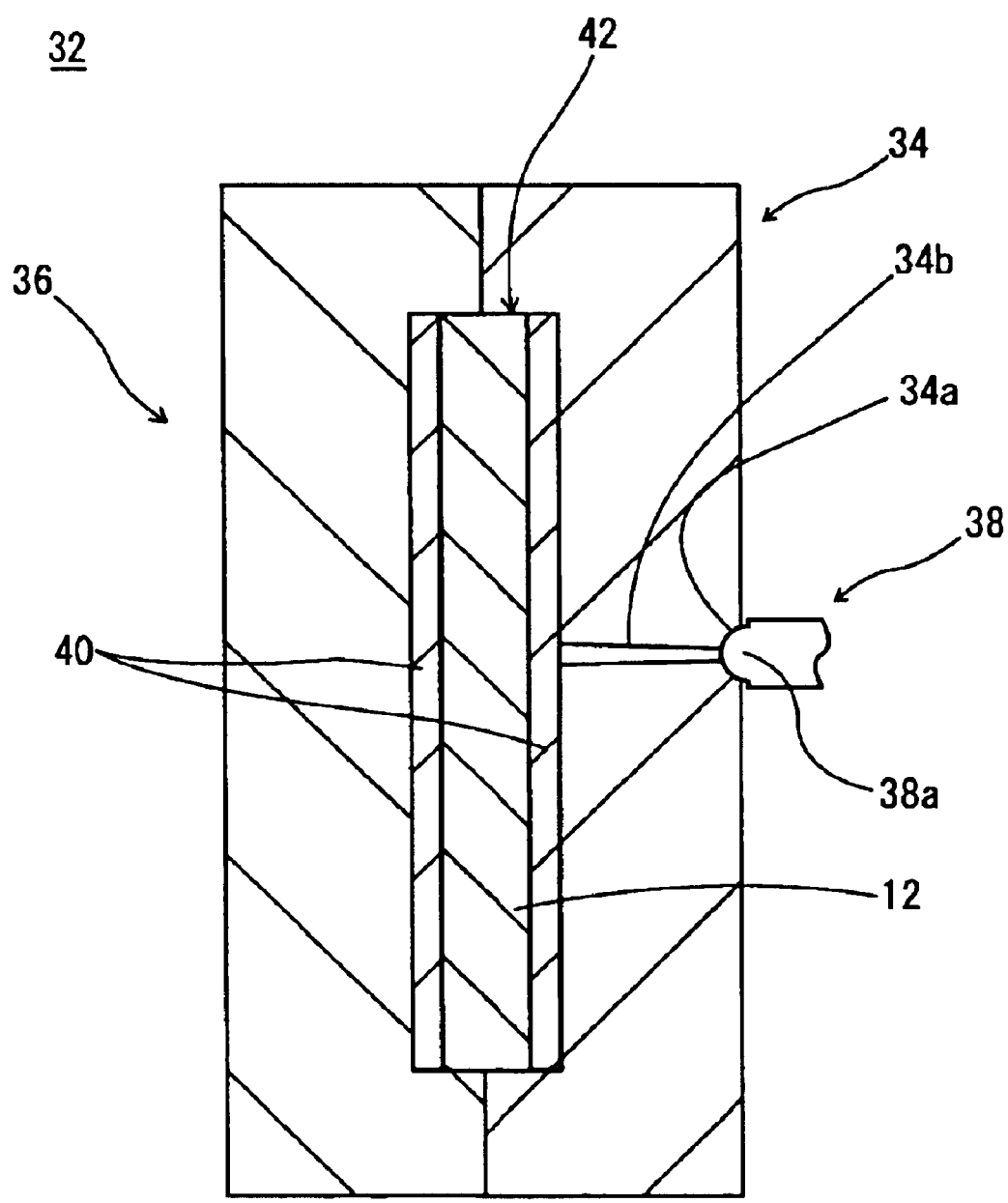
FIG. 10 is a view illustrating a method of manufacturing a liquid guide plate of yet another type.

In the case where a wedge-shaped light guide plate 12 is to be manufactured, it is possible to employ a manufacturing apparatus 46 having a wedge-shaped cavity 42 as shown in FIG. 9. In the case where a light guide plate 12 having opposite sides each formed with optical pattern 23 is to be manufactured, replica plates 40 may be fitted to opposite surfaces of cavity 42, respectively.

Method of Manufacturing a Replica Plate

The method of manufacturing a light guide plate described above employs replica plate 40 having pattern 44 as shown in FIG. 8. Such a replica plate 40 is manufactured by the following first method or second method for example.

<First Method>

Figure 11:
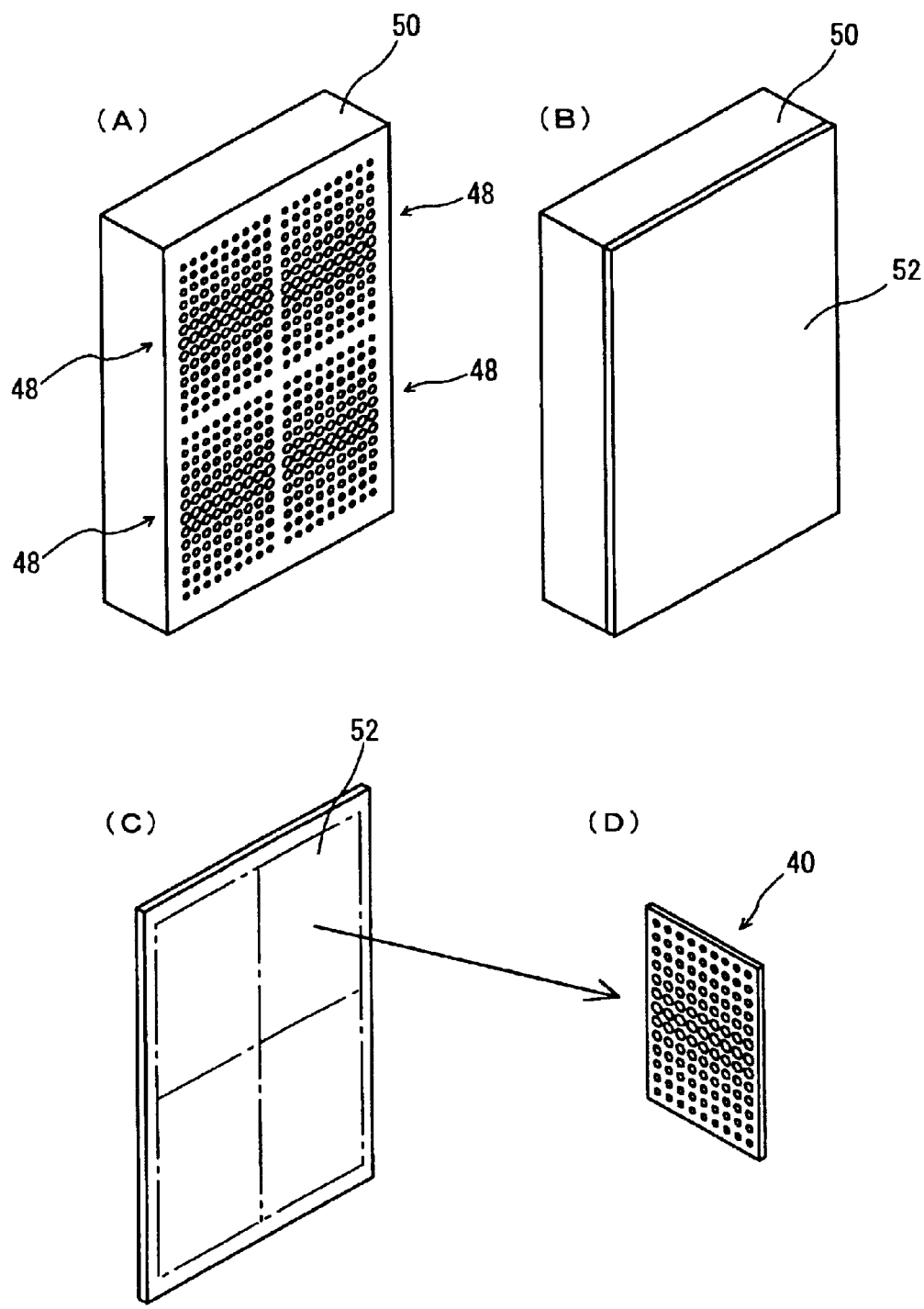
FIG. 11 is a view illustrating a method of manufacturing a replica plate.

First, a matrix 50 is provided having a plurality of patterns 48 each corresponding to the pattern 44 of an intended replica plate 40 as shown in FIG. 11(A). Subsequently, a nickel layer is grown on the surface of the matrix 50 to form a nickel plate 52 by an electroforming process as shown in FIG. 11(B). When the thinnest portion of the nickel plate 52 grows to a thickness of about 0.8 to about 15 mm, the nickel plate 52 is released from the matrix 50 as shown in FIG. 11(C). The nickel plate 52 is then cut to a predetermined size to afford the replica plate 40 as shown in FIG. 11(D).

The first method employing the electroforming process is capable of forming the pattern 44 of replica plate 40 accurately. Further, the first method is free from a problem that the time period needed for the manufacture becomes too long because the thickness of the thinnest portion of the replica plate 40 is limited to 15 mm or less.

<Second Method>

Figure 12:
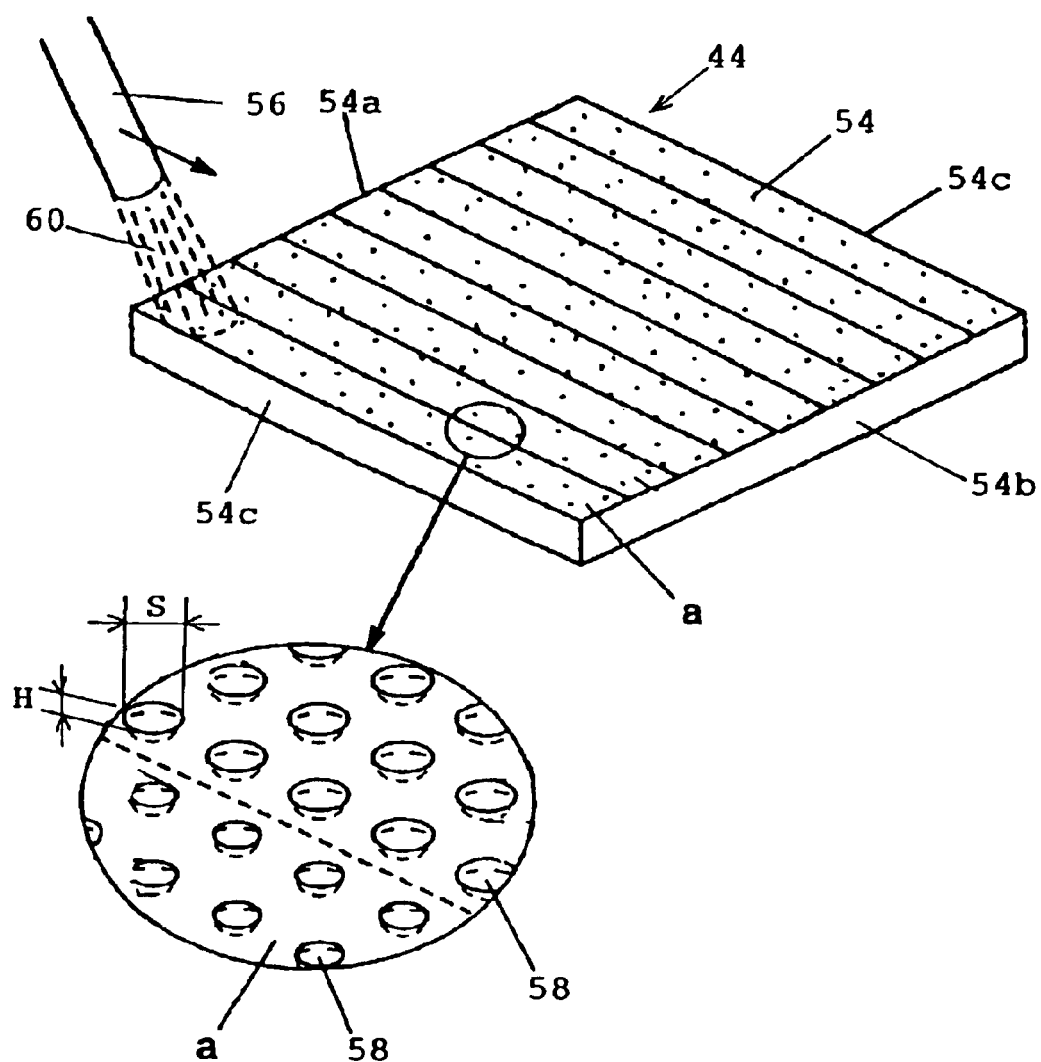
FIG. 12 is a view illustrating another method of manufacturing a replica plate.

First, a plate-shaped material 54 is provided from which replica plate 40 is to be formed, and pattern 44 consisting of plural depressions 58 is formed on the surface of this plate-shaped material 54 with use of a blast nozzle 56 as shown in FIG. 12.

The blast nozzle 56 is adapted to blast a spherical granular blast material 60 having a diameter of 100 μm or less (preferably about 10 to about 50 μm) against the surface of the plate-shaped material 54 at a predetermined pressure. The blast nozzle 56 is caused to reciprocate between one lateral side 54a and the other lateral side 54b of the plate-shaped material 54 while pitching within a predetermined width. The diameter S and the depth H of each depression 58 formed by the blast nozzle 56 are determined from the diameter and the blasting pressure of the blast material 60, respectively. If the diameter of the blast material 60 is fixed, the diameter S and the depth H increase with increasing blasting pressure or decrease with decreasing blasting pressure. The blasting pressure and the pitching width of the blast nozzle 56 are controlled by a control unit not shown to form a blast band (a) having a width corresponding to the pitching width on the surface of the plate-shaped material 54.

In forming optical pattern 23 on a flat light guide plate 12 as shown in FIG. 1, projections 22 need to have gradually increasing diameters and depths as they are situated closer to the center between the opposite light entry faces 12a. On the other hand, in forming optical pattern 23 on a wedge-shaped light guide plate 12 as shown in FIG. 9, projections 22 need to have gradually increasing diameters and depths as they are situated away from light entry face 12a and toward an opposite end face. Accordingly, the surface of the plate-shaped material 54 is formed with pattern 44 shown in FIG. 13 or 14 corresponding to one of these optical patterns 23.

Figure 13:
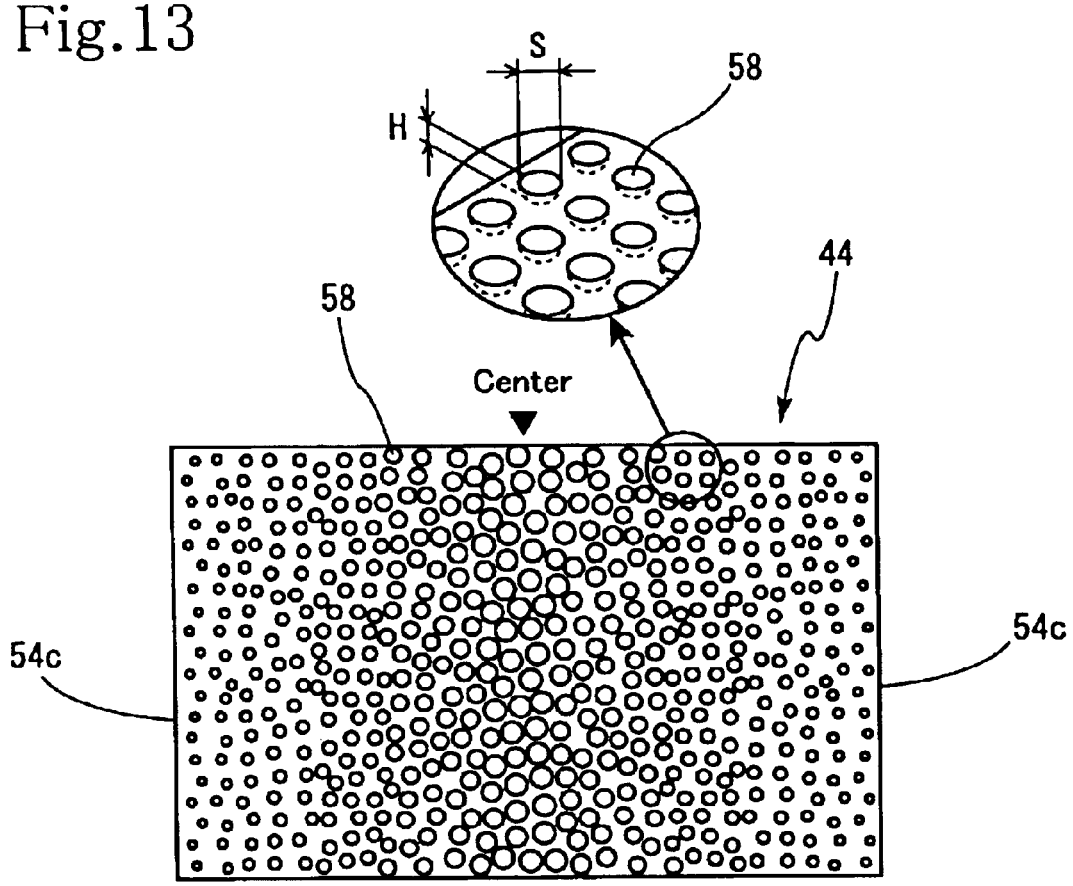
FIG. 13 is a diagram showing the relationship between a pattern used for a flat light guide plate and a blasting pressure.
Figure 13:
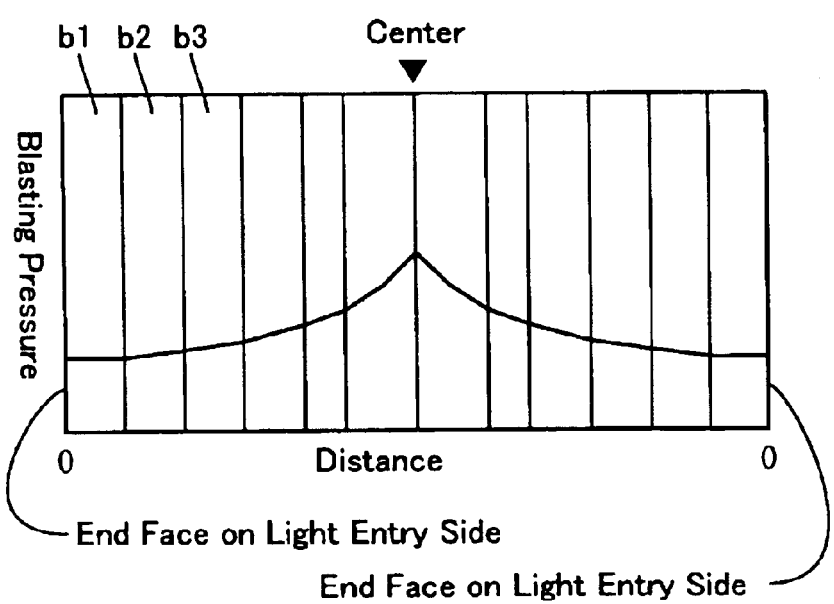

Pattern 44 shown in FIG. 13 corresponds to the optical pattern 23 to be formed on the flat light guide plate 12. In forming the pattern 44 of this type, the blasting pressure of the blast nozzle 56 is gradually increased as the blast nozzle 56 moves from end face 54c of the plate-shaped material 54 toward the center of the material 54. On the other hand, pattern 44 shown in FIG. 14 corresponds to the optical pattern 23 to be formed on the wedge-shaped light guide plate 12. In forming the pattern 44 of this type, the blasting pressure of the blast nozzle 56 is gradually increased as the blast nozzle 56 moves from end face 54c of the plate-shaped material 54 toward opposite end face 54d. In forming either pattern 44, the following blasting pressure control method is employed.

First, regions (b1), (b2), . . . and (bx+1) including plural blast bands (a) are assumed on the surface of the plate-shaped material 54. For each of the regions b1, b2, . . . and (bx+1), the amount of change (m1), (m2), . . . or (mx+1) in the blasting pressure against blast bands (a) is set constant.

The difference {(mx+1)·(mx)} between the amounts of changes (mx) and (mx+1) in the blasting pressure applied to adjacent regions (bx) and (bx+1) is limited to 0.02 MPa or lower. Based on these values thus set, the formation of pattern 44 with the blast nozzle 56 is started from the blast band (a) situated closest to end face 54c.

Figure 14:
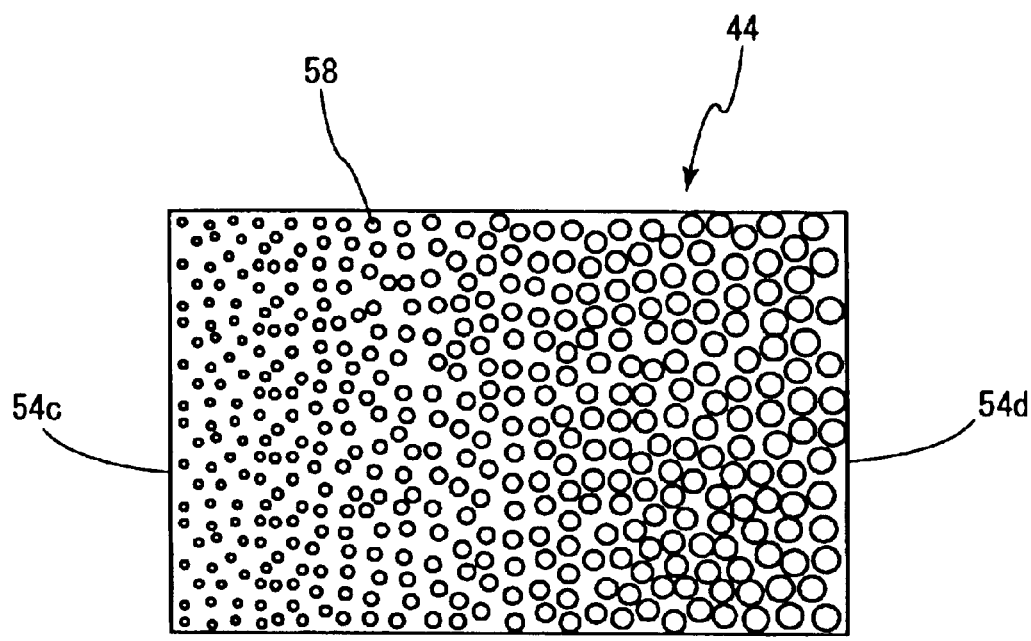
FIG. 14 is a diagram showing the relationship between a pattern used for a wedge-shaped light guide plate and a blasting pressure.
Figure 14:
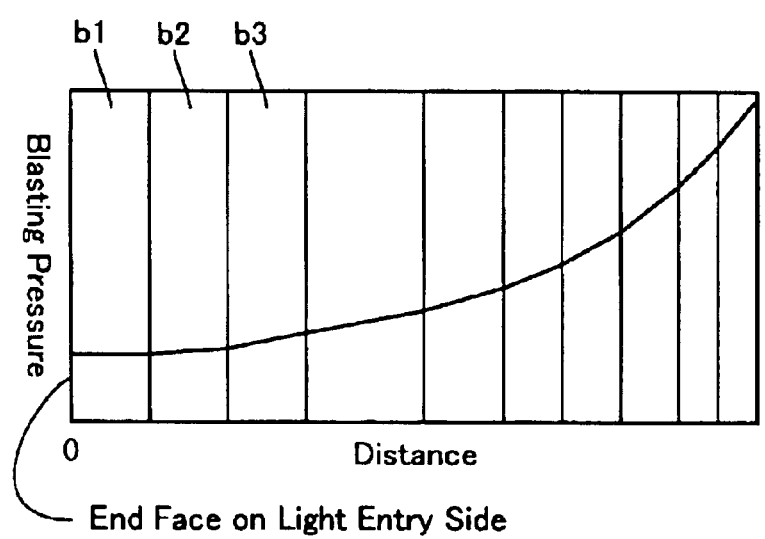
Figure 15:
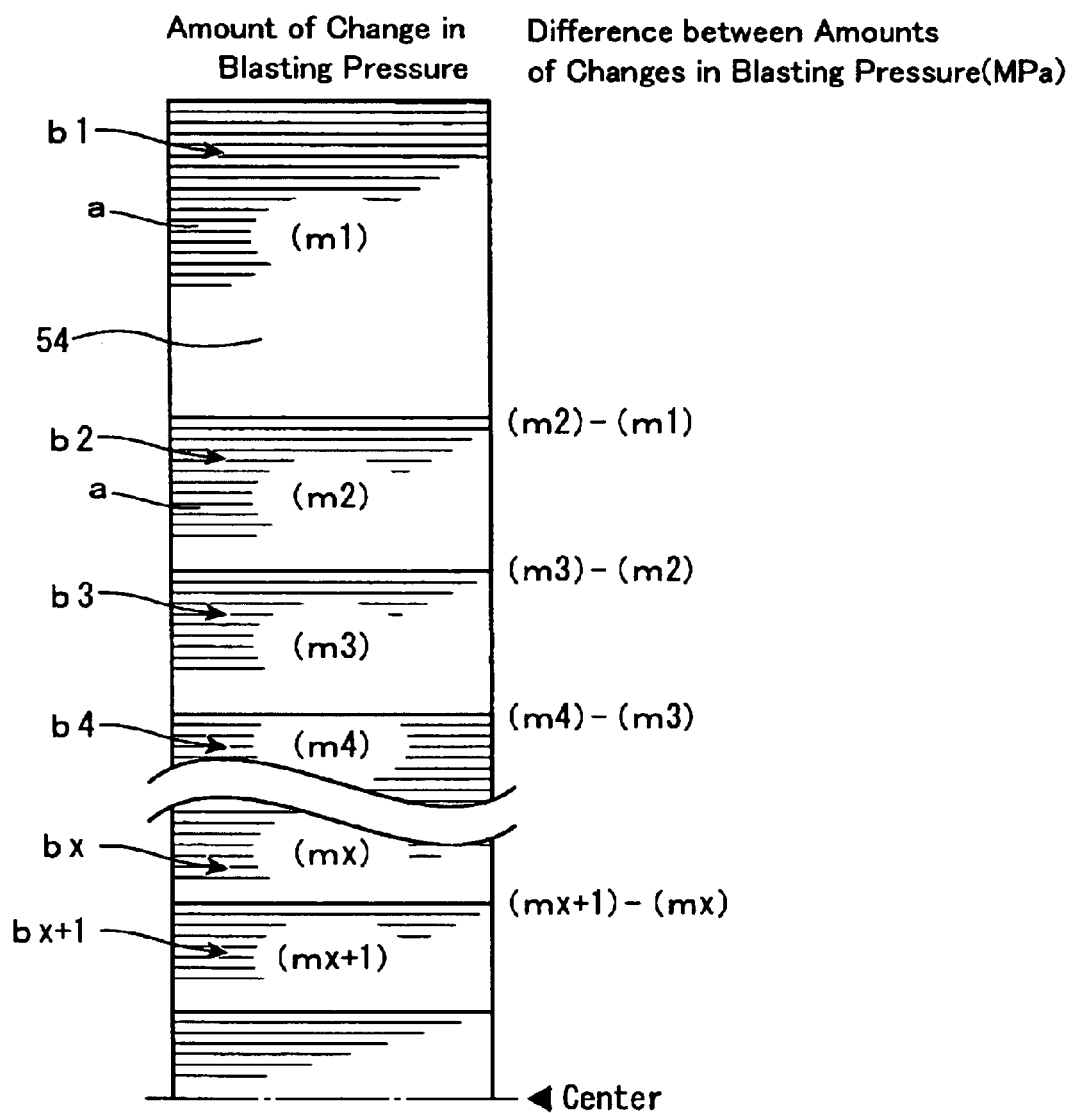
FIG. 15 is a view illustrating a blasting pressure control method.

The relationship between the distance from end face 54c and the blasting pressure in this method can be represented as a graph in FIG. 13 or 14. The graph does not largely bend at any boundary between adjacent ones of the regions (b1), (b2), ... (bx+1). This is because the difference between the amounts of changes in blasting pressure is limited to 0.02 MPa or lower.

Thus, light guide plate 12 manufactured by the use of replica plate 40 obtained by this method does not exhibit any steep change in the optical characteristics of its optical pattern 23 and, therefore, liquid crystal display panel (A) is free from any streaky unevenness which would otherwise be caused by light emitted from a conventional light guide plate.

The inventors of the present invention confirmed the practicality of the second method from the following experiment.

<Experiment>

According to the second method, 210 mm-long replica plate 40 was manufactured. With use of this replica plate 40 wedge-shaped light guide plate 12 was manufactured to examine its optical characteristics.

In the manufacture of the replica plate 40, 210 mm-long plate-shaped material 54 was provided, and blast nozzle 56 was positioned at a location spaced about 200 mm from the surface of the plate-shaped material 54. As shown in FIG. 16, nine regions (b1) to (b9) were assumed on the surface of the plate-shaped material 54, while the amounts of changes in blasting pressure for respective regions (b1) to (b9) were determined. The difference between the amounts of changes in the blasting pressure applied to adjacent regions was limited to 0.02 MPa or lower. Further, an initial blasting pressure of 0.34 MPa and a pitching width of 2 mm in each region were established. Based on these values thus set, the formation of pattern 44 with the blast nozzle 56 was started from the blast band (a) situated closest to end face 54c as shown in FIG. 12.

More specifically, for region (b1) extending over a distance of from 0 to 60 mm from end face 54c, the amount of change in the blasting pressure applied to blast bands (a) was adjusted to 0.002 MPa to form depressions 58. For region (b2) extending over a distance of from 60 to 90 mm from the end face 54c, the amount of change in the blasting pressure applied to blast bands (a) was adjusted to 0.003 MPa to form depressions 58. That is, the difference between the amounts of changes in the blasting pressure applied to adjacent regions (b1) and (b2) was adjusted to 0.001 MPa.

For region (b3) extending over a distance of from 90 to 102 mm from the end face 54c, the amount of change in the blasting pressure applied to blast bands (a) was adjusted to 0.005 MPa to form depressions 58. For region (b4) extending over a distance of from 102 to 114 mm from the end face 54c, the amount of change in the blasting pressure applied to blast bands (a) was adjusted to 0.0075 MPa to form depressions 58. That is, the difference between the amounts of changes in the blasting pressure applied to adjacent regions (b2) and (b3) was adjusted to 0.002 MPa, while the difference between the amounts of changes in the blasting pressure applied to adjacent regions (b3) and (b4) was adjusted to 0.0025 MPa. In this way, all the regions (b1) to (b9) were formed with depressions 58 based on the values shown in FIG. 16.

Planar lighting device 10 was assembled using light guide plate 12 manufactured with the use of the replica plate 40 thus obtained. Liquid crystal display panel (A) combined with the planar light device 10 did not exhibit any streaky unevenness.

Figure 17:
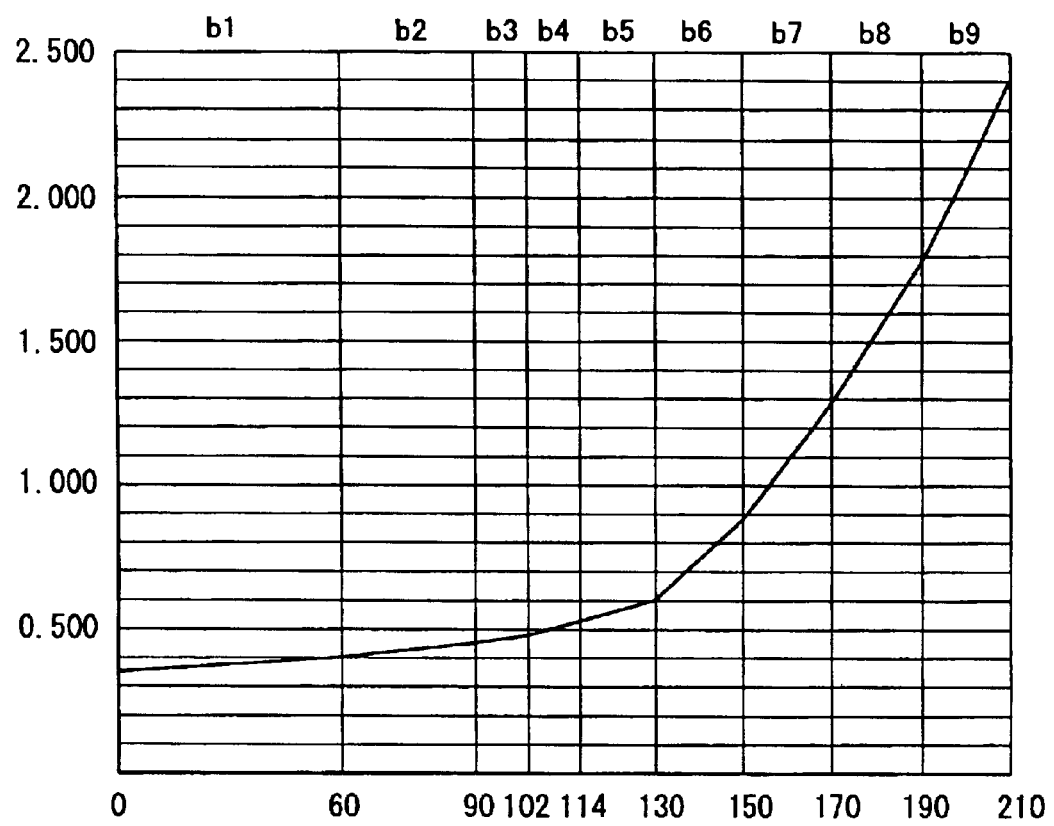
FIG. 17 is a graph showing a change in blasting pressure in the experiment.
Figure 18:
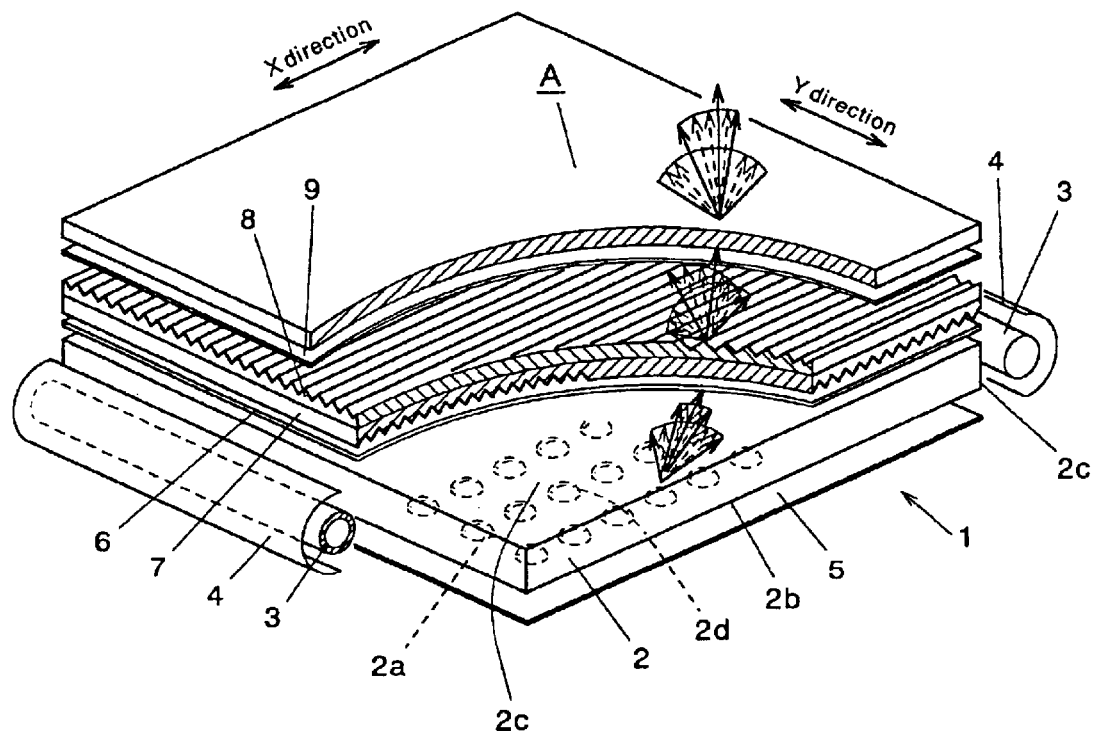
FIG. 18 is a perspective view showing a conventional planar lighting device.

The relationship between the distance from end face 54c and the blasting pressure according to this method was represented as a graph in FIG. 17. The graph did not largely bend at any boundary between adjacent ones of the regions (b1) to (b9).

The planar lighting device of the present invention is constructed to reflect light regularly at the hemispherical surfaces formed on the light guide plate and allow light to pass through the hemispherical surfaces and hence is capable of minimizing a loss of light due to scattering of light. Since the hemispherical surfaces can be molded integrally with the body portion of the light guide plate, there is no need to provide special parts separately. Thus, the planar lighting device makes it possible to realize a higher luminance easily without incurring an increase in cost as well as to meet the demand for a larger-size screen.

While only presently preferred embodiments of the present invention have been described in detail, as will be apparent for those skilled in the art, certain changes and modifications can be made in embodiments without departing from the spirit and scope of the present invention as defined by the following claims.

What is claimed is:

1. A planar lighting device comprising:

a light guide plate having a pair of opposite light entry faces, a light emitting face extending perpendicularly to the light entry faces, a plurality of hemispherical surfaces formed on the light emitting face, and a light non-emitting face opposite to the light emitting face;

a light source disposed to extend along each of the light entry faces;

a reflector for reflecting light from the light source toward a respective one of the light entry faces;

a reflecting plate disposed to extend along the light non-emitting face for reflecting light leaking from the light guide plate toward the light guide plate; and a lens sheet disposed to extend along the light emitting face and formed with a plurality of first ridges extending parallel with the light entry faces on a face thereof opposite to the light emitting face, the first ridges each having a triangular section.

2. The planar lighting device according to claim 1, further comprising a plurality of second ridges formed on the light non-emitting face of the light guide plate to extend in a direction perpendicular to the first ridges, the second ridges each having a triangular section, and a diffuser sheet disposed to extend along a light emitting face of the lens sheet.

3. The planar lighting device according to claim 1 or 2, further comprising a reflection-type polarizing film which allows one polarized component of light from the lens sheet to pass therethrough but reflects other polarized component of the light, the reflection-type polarizing film being disposed to extend along a light emitting face of the lens sheet.

4. The planar lighting device according to claim 1, wherein the light emitting face of the light guide plate is formed with a plurality of projections each having an outward surface forming each of the hemispherical surfaces.

5. The planar lighting device according to claim 1, wherein the light emitting face of the light guide plate is formed with a plurality of depressions each having an internal surface forming each of the hemispherical surfaces.

6. The planar lighting device according to claim 2, wherein the light emitting face of the light guide plate is formed with a plurality of projections each having an outward surface forming each of the hemispherical surfaces.

7. The planar lighting device according to claim 2, wherein the light emitting face of the light guide plate is formed with a plurality of depressions each having an internal surface forming each of the hemispherical surfaces.

8. The planar lighting device according to claim 3, wherein the light emitting face of the light guide plate is formed with a plurality of projections each having an outward surface forming each of the hemispherical surfaces.

9. The planar lighting device according to claim 3, wherein the light emitting face of the light guide plate is formed with a plurality of depressions each having an internal surface forming each of the hemispherical surfaces.

* * * * *